May 25, 1937.  C. H. QUICK  2,081,504
CONVEYING APPARATUS
Filed June 3, 1936  2 Sheets-Sheet 1
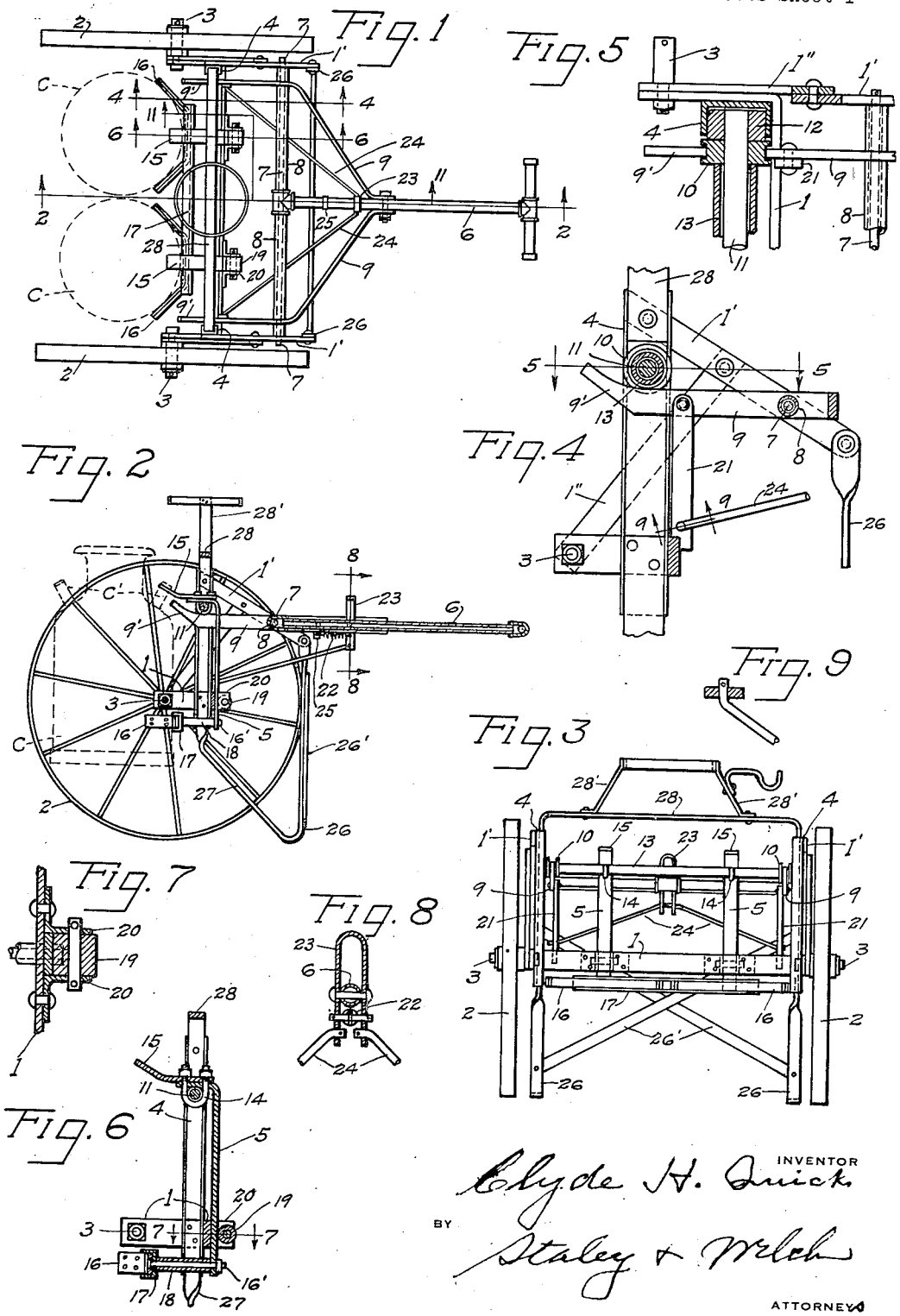
INVENTOR
Clyde H. Quick
BY
Staley & Welch
ATTORNEYS May 25, 1937.  C. H. QUICK  2,081,504
CONVEYING APPARATUS
Filed June 3, 1936  2 Sheets-Sheet 2
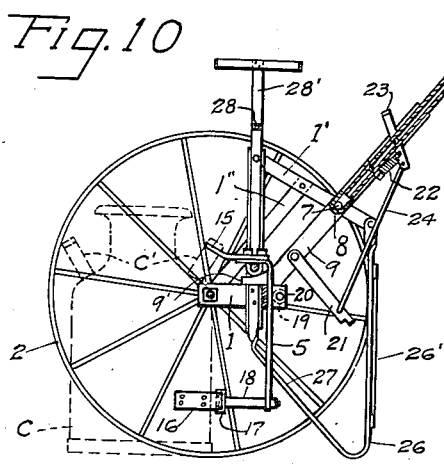
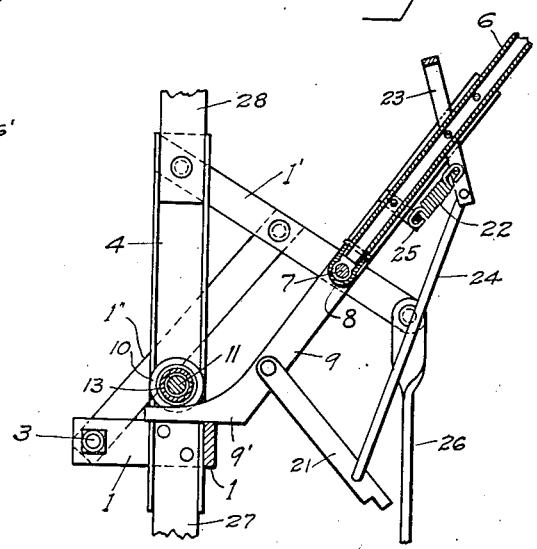
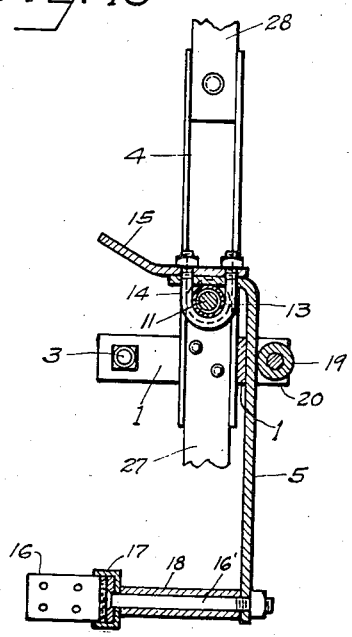
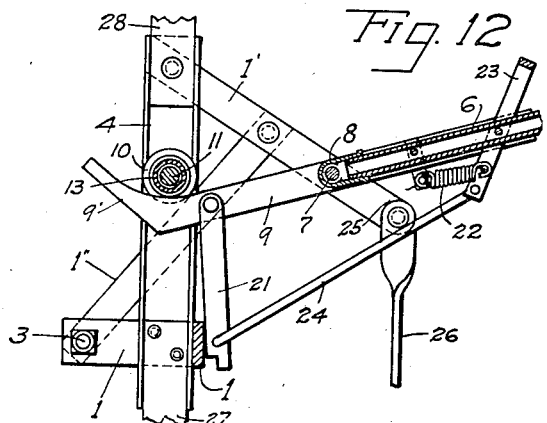
INVENTOR
Clyde H. Quick
BY Staley & Welch
ATTORNEYS Patented May 25, 1937

2,081,504

UNITED STATES PATENT OFFICE 2,081,504

CONVEYING APPARATUS

Clyde H. Quick, Springfield, Ohio

Application June 3, 1936, Serial No. 83,321

6 Claims. (Cl. 214—65.4)

This invention relates to conveying apparatus, it more particularly relating to an apparatus designed to pick up articles, such as milk cans, and convey them from one point to another.

The object of the invention is to provide a simple and effective apparatus which can be readily manipulated by hand and which is capable of engaging and elevating articles, such as filled milk cans, and conveying such articles from one point to another, and then discharging the articles, without the necessity of the operator of the apparatus handling the articles.

In the accompanying drawings:

Fig. 1 is a top plan view of an apparatus embodying my improvements.

Fig. 2 is a longitudinal section on the line 2—2 of Fig. 1.

Fig. 3 is a front elevation of the apparatus.

Fig. 4 is a section on the line 4—4 of Fig. 1.

Fig. 5 is a section on the line 5—5 of Fig. 4.

Fig. 6 is a section on the line 6—6 of Fig. 1.

Fig. 7 is a section on the line 7—7 of Fig. 6.

Fig. 8 is a section on the line 8—8 of Fig. 2.

Fig. 9 is a section on the line 9—9 of Fig. 4.

Fig. 10 is a section on the line 2—2 of Fig. 1, but showing the parts in a different position from that shown in Fig. 2.

Fig. 11 is an enlarged section on the line 11—11 of Fig. 1.

Fig. 12 is a sectional view of the parts shown in Fig. 11, but showing such parts in another position.

Fig. 13 is an enlarged sectional view of the parts shown in Fig. 6, but with the parts in different positions.

The main frame of the machine is indicated at 1, the frame being of a U-shaped character. This frame is supported by carrying wheels 2 which are loosely mounted upon stub axles 3 projecting from the side members of the main frame. Riveted to each longitudinal leg of the main frame is a vertically extending standard 4 formed of channel iron which acts as a guide for the supports for the article carriers. The present machine is equipped with two carriers 5 which are secured to a lifting and lowering mechanism constructed as follows:

A handle is indicated at 6 which is rigidly connected at its forward end to a shaft 7, the ends of the shaft being pivoted to auxiliary frame members 1' hereinafter more particularly described; suitable spacing sleeves 8 being interposed between the forward end of the handle and the auxiliary frame. Secured to the handle are two diverging members 9 which are also secured to the shaft 7 and each having its forward end 9' in the nature of a cam to engage the under side of a spool 10 rotatably mounted upon a shaft 11. This shaft 11 has loosely mounted on each end thereof a roller 12 which rides in the channel of the corresponding standard 4; a spacing sleeve 13 being interposed between the spools 10.

Each of the carriers 5 previously referred to is clamped to the sleeve 13 which surrounds the shaft 11 by a U-bolt 14. These U-bolts also serve to clamp in position hook-shaped members 15, the purpose of which is to engage some part of the articles to be conveyed such as the handles of a milk can. The lower end of each one of these carriers 5 has connected therewith diverging feet 16 by means of a bolt 16', these bolts also serving to secure in position a channel iron 17 which extends from one carrier 5 to the other to connect them together. Spacing sleeves 18 are preferably interposed between the carrier 5 and the channel iron 17. A lining of soft material such as brake lining is riveted to the feet 16 to prevent injury to the article to be conveyed.

In order to brace the carriers 5 when elevated the frame has for each carrier 5 a roll 19 carried by brackets 20 which project rearwardly from the frame 1 so that each roll will lie on the rear side of the corresponding carrier 5.

When the carriers 5 with their loads are in raised position, they are held in that position by two latches, one on each side of the machine. Each of these latches consists of a detent 21 having a notched lower end and having its upper end pivoted to the corresponding diverging member 9. For each detent a coil spring 22, having one end connected to an operating handle 23 and the other to a cleat 25 bolted to the handle 6, is employed to urge the detent to the position shown in Fig. 4 to hold the loaded carriers in elevated position. The lower end of the handle 23 is pivotally connected to the lower end of the detent by a rod 24.

Each of the auxiliary frame members 1' previously referred to is rigidly attached at one end to the corresponding channel-shaped standard 4 and at the other end rigidly attached to the upper end of one side 26 of a V-shaped supporting leg, the upper end of the other side 27 of which is rigidly attached to the frame 1, these legs serving to support the apparatus when at rest. Each of the auxiliary frame members is braced by a brace 1'' rigidly secured thereto and to the frame 1. Braces 26' connecting the leg member 26 are also employed to further brace the structure.

A U-shaped support 28 has its legs rigidly secured to the upper ends of the standards 4. The purpose of this support is to support a milk bucket and for that purpose the support has secured thereto an auxiliary support 28'. The lower ends of the side members of the support 28, which are secured to the standard 4, also act as stops for the lifting mechanism, the rolls 12 engaging therewith for that purpose.

The operation of the device will be explained in connection with milk cans, to the handling of which it is particularly adapted, although the apparatus may be used for handling other articles than milk cans. The present apparatus is capable of handling a pair of milk cans although it may be enlarged or reduced to handle a more or less number. With a pair of milk cans, indicated at C, sitting on the floor or ground and the conveying apparatus in a position of rest, as shown in Fig. 10, the operating handle is slightly elevated if necessary in order that the hook-shaped members 15 of the carriers 5 may be engaged respectively with a handle of each can. The handle member is then depressed so as to cause the handle member and diverging members 9 to pivot about the shaft 8 and the forward ends of the diverging members to be elevated so as to cause the cams 9' of the members 9 to engage the spools 10 on the shaft 11, further movement of the handle 7 causing the carriers 5, which as before described are attached to the sleeve 13 on the shaft 11, to be elevated together with the cans. During this elevating movement the parts are guided by the rolls 12 running in the channel-shaped members 4 and the degree of elevation is limited by the contact of these rolls 12 with the lower end of the members 28.

When the cans or other articles have been raised they are held in elevated position by the detents 21. When the conveying mechanism is at rest the detents are in the position shown in Fig. 11 in which position the springs 22 are inactive. As the handle is depressed in order to raise the cans or other articles each detent will be thrown to the position shown in Fig. 12, or in a position in contact with the frame 1, in which position the springs are just beginning to take the tension. As the mechanism rises further, the contact of the detents 21 with the frame places the spring 22 under further tension until the notched portion of each detent coincides with the upper edge of the frame at which point the springs will throw the detents in engaging position with the frame and hold the parts in raised position. The cans can then be transported to any suitable point and when it is desired to lower the parts to discharge the cans the handle member 23 is manipulated to release the detents by a forward movement of the upper portion of the operating handle.

Having thus described my invention, I claim:

1. In a conveying apparatus of the character described, a wheeled frame, a pair of vertically-extending guides one on each side of said frame and rigidly fixed thereto, a vertically movable shaft extending across said frame and guided by said guides, an article carrier connected with said shaft, means fixedly connected with said carrier to engage an article to be conveyed, and means for raising said shaft.

2. In a conveying apparatus of the character described, a wheeled frame, a shaft extending across said frame, rolls on the end of said shaft, vertical channels one on each side of said frame in which said rolls run to guide said shaft, a carrier connected with said shaft, means fixedly connected with said carrier to engage an article to be conveyed, and means for raising said shaft.

3. In a conveying apparatus of the character described, a wheeled frame, a carrier, means fixedly connected with said carrier to engage an article to be conveyed, a movable support for said carrier, fixed means on said frame for guiding said support, a pivoted operating handle, and means connected with said handle to engage said carrier support to raise said support and carrier.

4. In a conveying apparatus of the character described, a wheeled frame, a plurality of carriers, means on said frame for supporting said carriers, means fixedly connected with each carrier to engage an article to be conveyed, a shaft together with means for supporting the same from said frame, a pivoted operating handle on said shaft, a pair of pivoted diverging members connected with said handle also on said shaft, each diverging member having a part to engage said carrier supporting means to raise the same, and means fixedly carried by said frame to guide said article supporting means.

5. In a conveying apparatus of the character described, a wheeled frame, a pair of article carriers, a shaft with which said carriers are connected, means connected with each carrier to engage an article to be conveyed, a roll on each end of said shaft, channel-shaped standards on said frame to receive said rolls, rotatable spools also on said shaft, a second shaft supported from said frame, a pivoted operating handle on said second shaft, and pivoted diverging members connected with said handle also on said second shaft having cam-shaped forward ends to engage said spools.

6. In a conveying apparatus of the character described, a wheeled frame, an article carrier, means on said frame for supporting said carrier, means fixedly connected with said carrier to engage an article to be conveyed, a pivoted operating handle, a member connected therewith to engage said article supporting means, a latch pivoted to said member having its lower end arranged to engage said frame, a spring to throw said latch into locking position, a pivoted operating device supported by said handle, and a connection between said device and said latch to release said latch.

CLYDE H. QUICK.